INVENTOR
FREDERICK C. NEUHART

Patented Feb. 12, 1946

2,394,631

UNITED STATES PATENT OFFICE 2,394,631

APPARATUS FOR HEATING CATALYST CHAMBERS

Frederick C. Neuhart, Shidler, Okla., assignor to Phillips Petroleum Company, a corporation of Delaware Application October 2, 1942, Serial No. 460,580

5 Claims. (Cl. 23—288)

This invention relates to a method for heating conversion chambers and to apparatus therefor. More particularly it relates to a gas-fired furnace adapted to heat catalyst chambers uniformly by direct contact with hot combustion gases passing over the chambers in substantially straight-line flow from the combustion zone.

Use of catalyst in stationary chambers is common practice in promoting various reactions at relatively high temperatures. In the case of highly endothermic reactions in particular, a great deal of heat must be transferred into the catalyst bed to maintain desired reaction temperatures. A common practice is to fill slender elongated tubes with the catalytic material, and to dispose a group of such tubes, ordinarily arranged for flow of reactants in parallel, in a bath of heat exchange fluid such as steam, oil, diphenyl, mixtures of inorganic salts, molten metals, etc., with said fluid being heated separately to the desired temperature. These methods of heating are designed to heat the catalyst chambers in a relatively even manner so as to avoid hot or cold spots which would make for inefficient use of the catalyst.

Although such methods are comparatively expensive, they have found considerable satisfactory use in operations, such as catalytic cracking of oils, where the conversion temperatures are not too high, such as below 1000 to 1050° F. However it is virtually impossible to use such methods at temperatures much higher than these, such as are used in the dehydrogenation of normally gaseous hydrocarbons and particularly in dehydrogenations involving the production of appreciable quantities of diolefins such as butadiene, etc. This is because the heat exchange media decompose excessively at the temperatures necessary for such operations, about 1100° F. and above, because such media have excessively great corrosion properties and vapor pressures at such temperatures, and/or the materials from which the catalyst chambers are constructed lose their strength, both mechanical and corrosion resistant strength, at such temperatures.

It is an object of my invention to heat long narrow conversion tubes, particularly catalyst tubes.

It is a further object of my invention to provide an apparatus for heating catalyst tubes.

Still another object of my invention is to heat catalyst or other conversion tubes uniformly and directly with combustion gases without employing any secondary heat-exchange medium.

Further objects and advantages of my invention will become apparent from the accompanying disclosure and discussion.

I have now devised and developed a method of heating such conversion chambers, which I have found especially suitable for use in carrying out endothermic hydrocarbon conversions at high elevated temperatures, such as those above 1100° F., in which the chambers are placed vertically in a furnace of novel design in such a way that they are heated directly and primarily by combustion gases in the furnace, and in which a substantially uniform heating of the tubes is readily effected. In this manner, such indirect heat exchanging steps as described above are eliminated, with consequent increase in efficiency of the process, while avoiding uneven and uncontrolled distribution of heat to tubes which generally occurs in furnaces now known to the art. A further feature of my invention is the fact that, although the catalyst tubes are directly heated by combustion gases, the catalyst tubes receive a minimum of heat from the combustion zone by radiation from the flames of combustion. As a result the catalyst tubes are heated relatively uniformly on all sides and it is possible to put a lot of heat into the catalyst tubes without utilizing excessive temperature differentials.

My furnace is also so designed that the catalyst chambers are readily accessible and may be removed and replaced at will. This is made possible by the provision of removable sides, top, and floor of the section containing catalyst tubes. Thus the interior of the furnace is readily accessible, either from top, bottom or sides, and any one or all of the chambers are interchangeable, and can be replaced with a minimum of labor and time In fact, I have been able to open up this part of the apparatus in the middle of a run and replace catalyst tubes without cooling down the apparatus as a whole. In this way a convenient flexibility is provided which is of great value in situations wherein a variety of charge stocks is fed to the catalyst or wherein more than one type of conversion is carried out.

The furnace is several times taller than wide, so that the combustion gases pass through a high relatively narrow passageway, in one section of which the catalyst chambers or tubes are arranged vertically. A large volume of the combustion gases is recycled to the first part of the furnace. In sequence these gases pass through a checkerwork which distributes the flow evenly and starts the straight-line flow effect which is characteristic of the furnace, and from the checkerwork into a combustion zone into which flames from burners are injected. The total hot combustion gases then go directly into the narrow, tall passageway, passing in turn past catalyst tubes and past a set of adjustable vanes or dampers for straightening and regulating flow and in a vertical row. In a specific modification the combustion gases then pass through a section provided with burners and/or air intakes for adjusting the temperature, past a series of preheat tubes, through which reactants pass on their way to the catalyst chambers, past a second set of straightening and control vanes or dampers, then out into a collecting duct. From this duct the gases are recycled by a blower into a second duct running parallel to the furnace and thence again into the entrance of the furnace ahead of the checkerwork. A portion of the hot gases is vented from the last-named duct.

The various design features of the heater cooperate to cause the hot combustion gases to pass past the catalyst chambers in a rapid controlled flow, so that each portion of each chamber receives the proper amount of heat. This is even more important for catalyst chambers than it is for tubes being used for heating fluids or even for reactions such as cracking in the absence of catalysts, inasmuch as even a slight amount of overheating in a catalyst bed may frequently cause greatly accelerated reactions with consequent undesired products, fouling of catalyst, etc.

One modification of my apparatus, and of its manner of use, will now be described in connection with the accompanying drawing which forms a part of this specification and in which is shown diagrammatically a furnace and conversion tubes such as are discussed herein.

Figure 1:
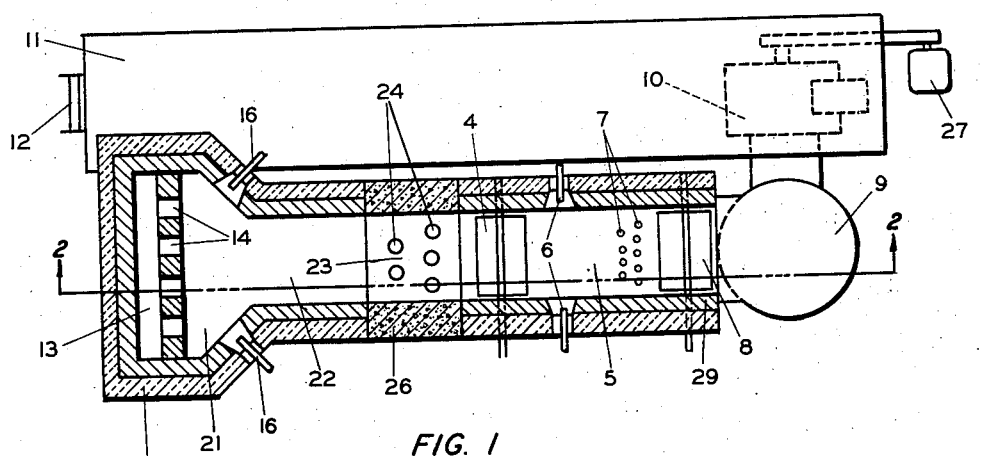
Figure 1 is a diagrammatic top plan view, partially in section, taken on the line 1—1 of Figure 2 in the direction of the arrows.

Referring now to the drawing, hot combustion gases are generated in the combustion section or zone 21, fuel being injected through burners 16, together with the necessary amounts of air for efficient combustion. Recirculated flue gases enter a passageway 13 from duct 11, and pass in a relatively uniform manner through checkerwork 14 in the combustion section 21, where they are mixed with combustion gases generated therein. In the preferred modification shown, the burners 16 are directed toward the checkerwork 14 and against the flow of the combined flue and combustion gases. In this manner the checkerwork 14 is directly heated by the combustion gases, and in turn heats the recirculated flue gases passing therethrough, and the mixing of its flue and combustion gases is promoted. Also, direct transfer of heat from the flames to the catalyst tubes 24 is minimized. The mixed combustion gases and recirculated flue gases then pass through a tall, narrow opening in the combustion section into the tall, narrow passageway 22, where the gases first receive the straightening effect of the first tier of movable vanes or dampers 4. The gases then pass through section 23 wherein are located the vertical catalyst tubes 24, and pass rapidly past these catalyst tubes. The gases then pass through the tier, or vertical row of damper means 4. These damper means are individually adjustable, and although shown as having horizontal axes may have vertical axes, if desired. These damper means are so adjusted that the rate of flow of the flue gases past the catalyst tubes at various heights provides the required temperature at various points along the length of the catalyst tubes. The natural path of the hot gases is upwardly, due to convection forces, and generally it is necessary to provide a greater heat input into lower portions of the catalyst tubes than in higher. With the arrangement shown I have been able to overcome the tendency of the hot gases to rise and to supply the necessary amount of heat to lower portions of the catalyst tubes. While the damper means 4 may be supplemented by additional damper means, or other directive means, in the section 22, not shown, I have found that a more positive control is effected with a single damper means placed as shown than placed only in the section 22.

From damper means 4 the gases pass into and through a section 5, then past preheat coils 7, through a damper means 8 to a collecting duct 9. Material which is to be converted in the catalyst tubes 24 is heated to or near the desired reaction temperature in preheat coils 7. The passage of the gases past the coils 7 is controlled by the damper means 8 in a manner analogous to the control effected by damper means 4 on the gases passing catalyst tubes 24. Damper means 8 may have vertical instead of the horizontal axes shown, as will be readily appreciated, and should be individually controlled. Depending primarily on the amount of material to be heated in preheat coils 7, and also upon its initial temperature, more or less heat may be required than can be supplied by the gases leaving damper means 4. When more heat is required, this may be supplied by supplemental burners 6, placed intermediate damper means 4 and the preheat coils 7. When less heat is required cooler air may be admitted through ports 6A. At times I have operated without the use of either burners 6 or ports 6A, at times with one and at other times with the other.

After leaving damper means 8 the gases enter duct 9 and pass downward into blower 10, which forces them into a recycle duct 11. Blower 10 is operated by a suitable prime mover, such as motor 27. From recycle duct 11 the major part of the gases pass into duct 28, and from there into section 13 for passage through checkerwork 14, as previously described. A suitable controlled portion of the gases are discharged through vent 12. The duct 28 may also be provided with a damper, not shown, to control the pressure in duct 11 and partially to control the discharge of gases through vent 12. Duct 9 is provided with a damper 15, above the furnace, which usually remains closed but which can be quickly opened in case power failure should stop the blower 10. Under some conditions it may be found expedient to use damper 15 as a vent in addition to, or in place of, vent 12.

The entire furnace is preferably lined with fire brick 29, and covered with suitable insulating material 25, such as rock wool. The sides and top and bottom of section 23 are preferably removable, and I have found a satisfactory construction is to have them made of precast refractory 26 faced with heat-resisting steel and covered on the outside with sheet iron which can be a part of the mold used in casting the refractory. The floor and top can be in two or more parts for easy removal, with each side in one or more large pieces. Preferably the entire furnace is elevated, standing on suitable supports not shown, so that it is readily accessible from below, and the catalyst tubes 24 are supported from the top ends, by hangers or other suitable means not shown. The upper ends may be within the furnace, itself, or may be separated from the interior by a suitable section of insulating material. When used to contain a catalyst mass which continuously or intermittently flows down through the catalyst tubes 24, the ends may extend above the furnace to connect with suitable means for supplying catalyst. Although the bottom ends of the catalyst tubes 24 may be within the furnace, preferably they are outside of and below the furnace. This arrangement facilitates removal from the catalyst tubes both when a stationary catalyst bed and when a continuously or intermittently flowing catalyst bed is used. The floor pieces of section 23 may be supported from the framework and fastened together by means of keys, or pins, as with a hasp without a hinge. The side sections may rest on the floor sections and can be held in place by latches similar to those for supporting the floor. The top sections in like manner may rest on the side sections and can be similarly fastened. With such an arrangement the top, wall and floor sections can be removed by sliding the above mentioned pins and picking up the individual sections with a hoist or crane.

It will be appreciated that although I have shown a complete apparatus including means for preheating the material to be converted in the catalyst tubes, the efficient method and apparatus disclosed for heating the catalyst tubes may be employed without including the preheating section between damper means 4 and duct 9 as an integral part thereof. However, the complete combination shown is generally to be preferred. It will be appreciated by one skilled in the art that the drawing is diagrammatic, with unessential detail omitted, and suitable modifications can be made in particular circumstances without departing from the spirit of the disclosure and teachings or from the scope of the claims. The invention finds particular application in the conversion of hydrocarbons, such as the catalytic cracking of petroleum fractions, reforming of petroleum fractions, aromatization, dehydrogenation to olefins and/or diolefins, etc.

Figure 2:
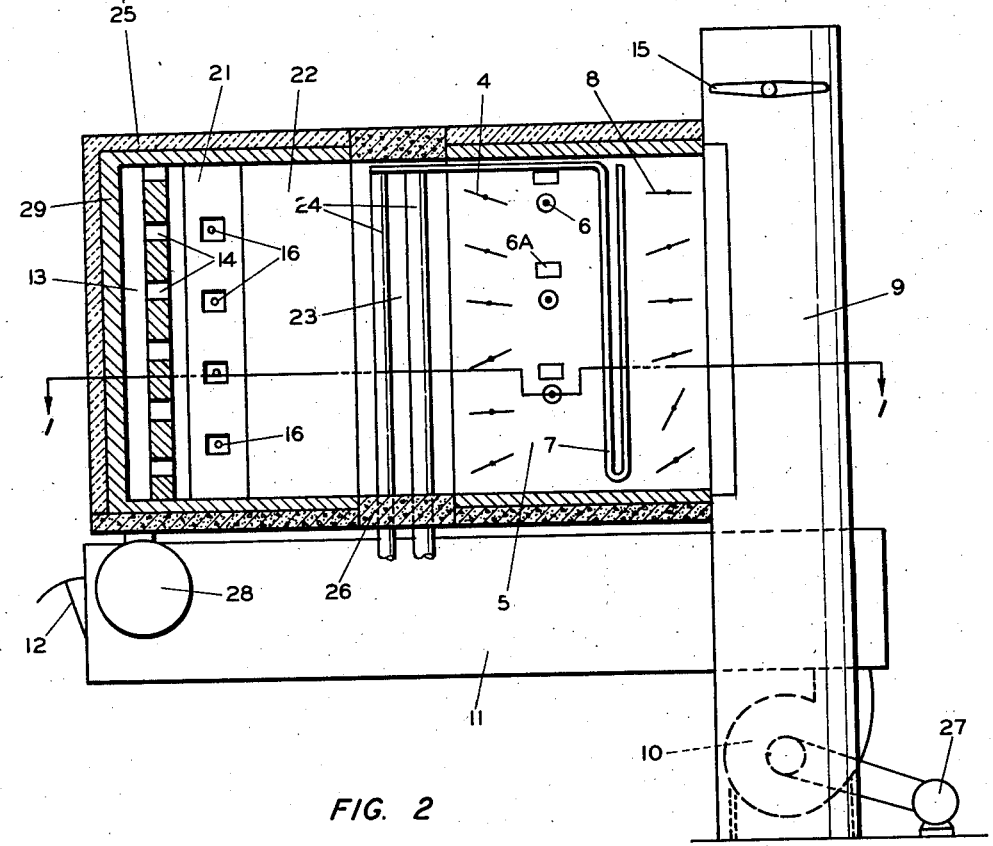
Figure 2 is a diagrammatic side elevation, partially in section, taken on the line 2—2 of Figure 1 in the direction of the arrows.

As an example of the practice of my invention, the furnace illustrated in Figures 1 and 2 was used to effect the dehydrogenation of normal butane. A single, vertical catalyst tube, 4 inches in diameter and 10 feet long was used, and was filled with a granular dehydrogenation catalyst. A stream of normal butane was charged at a space velocity of 1400 volumes per volume of catalyst per hour (normal temperature and pressure), under an initial pressure of about 20 to 25 pounds per square inch gage. The data given in the accompanying table were recorded during one period of catalyst activity. The temperatures of the catalyst tube were measured by thermocouples firmly attached to the outside surface. The flow of flue gases through the catalyst section, past the catalyst tube, was from east to west. At a level four feet down from the top of the catalyst tube, and at another level eight feet down, thermocouples were also placed at four equidistant points around the catalyst tube, and these temperatures are also shown. The temperature of the flue gas passing through this catalyst section was measured by thermocouples extending into the flue gas stream. The "Butane preheat temp." is the temperature of the butane leaving the preheating coil. The temperature of the recycled flue gas was measured in the duct just prior to the reintroduction of the gas into the furnace proper. The hot gases were forced past the catalyst tube at a rate of about 14 feet per second. The per cent of unsaturates was obtained by analysis of the effluent of the catalyst tube and represents the total amount of unsaturates present in the effluent stream. It is to be noted that although the furnace was ten feet high, and therefore there was a considerable tendency for the combustion gases to rise due to convection, there is a remarkable uniformity in the flue gas temperatures ranging from top to bottom.

|  | Time | | | | |
|---|---|---|---|---|---|
|  | 19:00 | 19:15 | 19:30 | 19:45 | |
| Pressure, lbs. per sq. in.: | | | | | |
| Inlet | 19 | 23 | 24 | 25 | |
| Outlet | 2.9 | 2.9 | 3.1 | 3.5 | |
| Catalyst tube temp., °F.: | | | | | |
| Top | 1,110 | 1,130 | 1,143 | 1,130 | |
| 2 ft. down | 1,085 | 1,090 | 1,098 | 1,091 | |
| 4 ft. down | 1,121 | 1,120 | 1,130 | 1,120 | |
| 6 ft. down | 1,152 | 1,156 | 1,164 | 1,151 | |
| 8 ft. down | 1,113 | 1,124 | 1,128 | 1,120 | |
| Bottom | 1,113 | 1,124 | 1,128 | 1,120 | |
| 4 ft. down: | | | | | |
| South | 1,121 | 1,120 | 1,130 | 1,120 | |
| West | 1,110 | 1,108 | 1,119 | 1,110 | |
| North | 1,115 | 1,114 | 1,125 | 1,115 | |
| East | 1,111 | 1,110 | 1,120 | 1,110 | |
| 8 ft. down: | | | | | |
| South | 1,113 | 1,124 | 1,128 | 1,120 | |
| West | 1,086 | 1,094 | 1,100 | 1,090 | |
| North | 1,100 | 1,114 | 1,119 | 1,108 | |
| East | 1,108 | 1,118 | 1,122 | 1,110 | |
| Flue gas temp., °F.: | | | | | |
| 2 ft. down | 1,130 | 1,172 | 1,164 | 1,151 | |
| 4 ft. down | 1,217 | 1,230 | 1,210 | 1,202 | |
| 6 ft. down | 1,220 | 1,220 | 1,200 | 1,190 | |
| 8 ft. down | 1,170 | 1,170 | 1,160 | 1,150 | |
| Butane preheat temp | 1,045 | 1,070 | 1,070 | 1,065 | |
| Recycled flue gas, °F | 837 | 850 | 850 | 845 | |
| Time | 19:03 | 19:10 | 19:21 | 19:35 | 19:40 |
| Per cent unsats | 27.8 | 27.0 | 26.7 | 26.2 | 25.0 |

This example is illustrative, and should not be construed to limit my invention unnecessarily. It is to be appreciated that the dehydrogenation reaction is endothermic, considerable quantities of heat being taken up. Although my invention finds widest use in supplying heat to endothermic reactions, it is also satisfactorily used in removing heat from exothermic reactions. Thus I have regenerated spent catalysts in situ in the furnace described, by burning off the carbonaceous impurities, and have successfully removed the heat formed in such a reaction by passing cooler gases, to remove heat, past the catalyst tubes in the same manner as hot gases were used to heat the catalyst tubes in the other part of the cycle.

I claim:

1. A conversion tube and heater therefor which comprise a horizontally elongated continuous chamber comprising a substantially closed first end and an open outlet end, a perforated transverse back wall within said chamber spaced from said first end and forming a space therebetween, fuel burners opening into said chamber and directed away from said outlet end and toward said perforated back wall to furnish direct heat thereto, at least one vertical conversion tube disposed in said chamber beyond said fuel burners toward said outlet end, a vertical tier of dampers within said chamber beyond said conversion tube toward said outlet end, each damper adapted for movement about a horizontal axis transverse of said chamber, said chamber having a substantially uniform transverse cross-section of greater height than width at least from a point between said burners and said conversion tube to a point between said dampers and said outlet end, conduit means connecting said outlet end with said space between said closed first end and said perforated back wall, and a gas discharge opening in said conduit means.

2. A conversion tube, preheat tube, and heater therefor which comprise a horizontally elongated continuous chamber comprising a substantially closed first end and an open outlet end, a perforated transverse back wall within said chamber spaced from said first end and forming a space therebetween, fuel burners opening into said chamber and directed away from said outlet end and toward said perforated back wall to furnish direct heat thereto, at least one vertical conversion tube disposed in said chamber beyond said fuel burners toward said outlet end, a vertical tier of dampers within said chamber beyond said conversion tube toward said outlet end, each damper adapted for movement about a horizontal axis transverse of said chamber, at least one vertical preheat tube disposed in said chamber beyond said tier of dampers toward said outlet end, a second vertical tier of dampers within said chamber beyond said preheat tube toward said outlet end, each damper adapted for movement about a horizontal axis transverse of said chamber, said chamber having a substantially uniform transverse cross-section of greater height than width at least from a point between said burners and said conversion tube to a point between said second tier of dampers and said outlet end, conduit means connecting said outlet end with said space between said closed first end and said perforated back wall, and a gas discharge opening in said conduit means.

3. The apparatus of claim 2 including fluid inlet means intermediate the first-mentioned tier of dampers and said preheat tube for introducing temperature-altering fluid into said chamber.

4. A conversion tube and heater therefor which comprise a horizontally elongated continuous chamber comprising a substantially closed first end and an open outlet end, a perforated transverse back wall within said chamber spaced from said first end and forming a space therebetween, conduit means for introducing gases into said space for flow through said perforated wall toward said outlet end, fuel burners opening into said chamber and directed away from said outlet end and toward said perforated back wall to furnish direct heat thereto, at least one vertical conversion tube disposed in said chamber beyond said fuel burners toward said outlet end, a vertical tier of dampers within said chamber beyond said conversion tube toward said outlet end, each damper adapted for movement about a horizontal axis transverse of said chamber, said chamber having a substantially uniform transverse cross-section of greater height than width at least from a point between said burners and said conversion tube to a point between said dampers and said outlet end.

5. A thermal conversion unit comprising in combination a heating chamber having a perforated gas-distributing wall, said chamber having a flue portion leading from said wall, reentrant walls in said flue portion at least partially facing said perforated wall, means supplying a gas under pressure through the perforations in said perforated wall, whereby said gas passes through said flue portion, burner means in said reentrant walls directed toward said perforated wall for heating said gas, at least one tube for thermal conversion passing through said flue portion beyond said reentrant walls, and means to pass fluids to be converted through said conversion tube.

FRED. C. NEUHART.